United States Patent [19]

Hepworth et al.

[11] 4,006,457
[45] Feb. 1, 1977

[54] LOGIC CIRCUITRY FOR SELECTION OF DEDICATED REGISTERS

[75] Inventors: Edward C. Hepworth, Apache Junction; Rodney J. Means, Tempe, both of Ariz.; Charles I. Peddle, Norristown, Pa.

[73] Assignee: Motorola, Inc., Chicago, Ill.

[22] Filed: Feb. 18, 1975

[21] Appl. No.: 550,338

[52] U.S. Cl. .............................. 340/147 R; 178/50; 178/58 R; 179/15 A; 340/173 R
[51] Int. Cl.$^2$ .................. H04Q 9/00; G11C 17/00; H04L 5/00
[58] Field of Search ....... 340/147 R, 173 R, 147 C, 340/172.5; 179/15 A; 178/50, 58 R

[56] References Cited

UNITED STATES PATENTS

| | | | |
|---|---|---|---|
| 3,781,826 | 12/1973 | Beausoleil | 340/173 R |
| 3,832,688 | 8/1974 | Strojny et al. | 340/147 R |
| 3,882,470 | 5/1975 | Hunter | 340/173 R |
| 3,892,925 | 7/1975 | Fisk et al. | 179/15 A X |
| 3,900,833 | 8/1975 | Rogers | 340/147 C |
| 3,942,162 | 3/1976 | Buchanan | 340/173 R |

*Primary Examiner*—Donald J. Yusko
*Attorney, Agent, or Firm*—Charles R. Hoffman

[57] ABSTRACT

An MOS (Metal-Oxide-Semiconductor) integrated circuit includes four dedicated registers thereon, two of which are "write only" registers having the capability of being written into, but not read from, by means of buffer circuitry for coupling a bidirectional data bus to the dedicated registers. The other two dedicated registers are "read only" registers having the capability of being read from, but not written into, by means of the buffer circuitry. The integrated circuit chip is itself addressable by means of a plurality of address conductors of an address bus coupleable to the integrated circuit chip, and the four dedicated registers within the integrated circuit chip are further addressable by means of an additional address conductor called a register select address line. A control input conductor is coupled to the integrated circuit chip and is used to control the direction of data flow of the buffer circuitry and is also used in conjunction with the register select address line to select one of four dedicated registers. This provides the advantage of reducing the number of external connections required for the integrated circuit chip, and is possible only because the registers are dedicated.

12 Claims, 4 Drawing Figures

LOGIC CIRCUITRY FOR SELECTION OF DEDICATED REGISTERS

RELATED APPLICATIONS

This application is related to assignee's copending U.S. Patent Applications Ser. No. 519,138 "Interface Adaptor Architecture," Ser. No. 519,150 "Microprocessor Architecture," and Ser. No. 519,149 "Microprocessor System" by Bennett et al, all filed on Oct. 30, 1974, and to assignee's copending U.S. Pat. Applications, "Asynchronous Communications Interface Adaptor," Ser. No. 550,340, "Interrupt Status Indication Logic for Polled Interrupt Digital System," docket number SC-75711, "Asynchronous Status Interlock Circuit for Interface Adaptor," Ser. No. 550,883, and "Digital System With Peripheral Control of Interface Adaptor," Ser. No. 550,311, all by Hepworth, et. Al., filed on even date herewith.

BACKGROUND OF THE INVENTION

The number of external connections available for an integrated circuit is frequently a limitation, especially for large scale integrated circuits incorporating many circuit functions on a single chip. This limitation causes many constraints on logic design and circuit design of a large scale integrated (LSI) circuit chip. Mini-computer and micro-computer system utilizing LSI integrated circuit microprocessor units (MPU) and associated external random access memory (RAM), read only memory (ROM) and specialized interface adaptor circuits all coupled to a single bidirectional data bus are known in the art. Some of the specialized interface adaptor circuits have a plurality of programmable registers selectable on a particular chip. Direct selection of registers on an interface adaptor chip requires utilization of external pins to provide the necessary binary address inputs. Control input lines are also required to such interface adaptor chips to control the direction of data flow to or from the interface adaptor chip. It is always desirable to eliminate external connections if possible, since the economics of packaging integrated circuits requires as few external pins per circuit function on a chip as possible. When too few external connections are available, needed functions on the chip may have to be discarded, and additional circuitry may be required on the chip to derive a signal which could be more conveniently provided from an external source. This increases the size of the chip, and often requires complex circuitry which requires more chip area and may be more sensitive to various processing parameters and result in lower chip yield and therefore higher product cost.

SUMMARY OF THE INVENTION

It is an object of this invention to provide an integrated circuit having a reduced number of external connections thereto.

Briefly described, the invention is a logic circuit for selecting one of a plurality of dedicated registers, and accomplishing this with a minimum number of external inputs. A plurality of dedicated registers of a first type and a plurality of dedicated registers of a second type are provided. A plurality of decode gates are coupled, respectively, to a selection input of each of the dedicated registers. Each of the gates has an input coupled to an external select-bus a clock signal input, a register select bus, and a control bus. The total number of inputs to the decode gate, exclusive of the external select-bus and clock signal input is less than N where there are $2^N$ dedicated registers.

DESCRIPTION OF THE INVENTION

Figure 1:
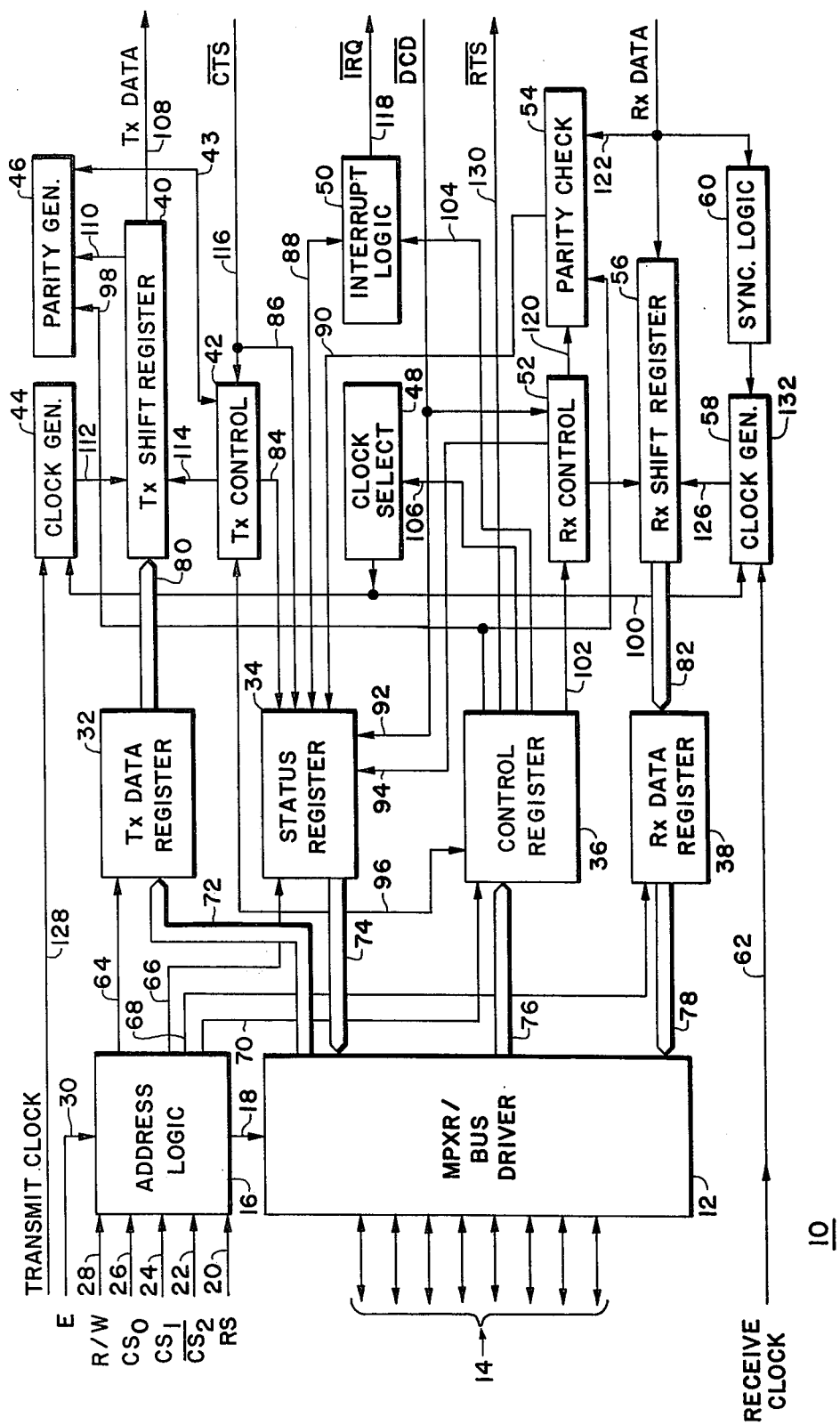
FIG. 1 is a partial schematic diagram representing an embodiment of the invention.

FIG. 1 is a block diagram of an integrated circuit version of an asynchronous interface adapter (ACIA) circuit according to the invention. ACIA chip 10 has eight bidirectional data input/output lines forming a bidirectional data bus 14 connected to multiplexor (MPXR) bus driver circuitry 12 of ACIA chip 10. Enable (E) input 30, read/write (R/W), input 28, chip select inputs 26, 24, and 22 (also designated, respectively, by $CS_o$, $CS_1$, and $\overline{CS_2}$) and register select (RS) input 20 are all connected to address logic circuitry 16, which is coupled to multiplexor bus driver circuitry 12 (referred to hereinafter as buffer circuitry 12) by means of one or more connections 18. In FIG. 1 the arrows indicate the usual direction of signal or data flow to or from a particular block of circuitry. Some of the solid lines are to be understood to represent a single conductor, while others may represent a plurality of separate conductors. The wide coupling elements such as by 72, 74, 76, 78, etc., represent busses which may include, for example, eight conductors for a one byte word system. The pointed ends of the buses indicate the direction of data flow and the same general format as exists and when the data received or driven by bidirectional data bus 14.

ACIA chip 10 includes four internal registers, including transmit data register 32, (designated TX Data Register in FIG. 1) receive data register 38 (designated RX Data Register in FIG. 1), control register 36, and status register 34. Address logic 16 causes one of the above mentioned registers to be selected, via connections 64, 66, 68, and 70, which are also connected, respectively, to transmit data register 32, status register 34, control register 36, and receive data register 38. Transmit data register 32 is coupled to buffer circuitry 12 by means of bus 72. Status register 34 is coupled to buffer circuitry 12 by means of bus 74. Control register 36 is coupled to buffer circuitry 12 by means of bus 76. Receive data register 38 is coupled to buffer circuitry 12 by bus 78.

Transmit data register 32, which is a write only register, is connected by means of bus 80 to transmit shift register 40. Data in transmit data register 32 is shifted in parallel to shift register 40 and transmitted onto transmit data line 108 (designated TX Data) in serial format, in accordance with a clock signal being supplied on conductor 112 connected to transmit shift register 40 and to clock generator 44. The clock signal on conductor 112 is derived from input transmit clock 128. The divide ratio between the signal on conductor 128 and the signal on conductor 112 is determined by an internal control signal on conductor 100, which is connected to clock generator 44, clock generator 58, parity check circuit 54, and clock select circuit 48.

Parity generator circuit 46 is connected to transmit shift register 40 by means of a plurality of conductors 110 and is also connected to control register 36 by means of conductor 98. Parity generator 46 and transmitter control circuit 42 are coupled by conductor 43. Receive data register 38 is connected to receive shift register 56 by data bus 82. Data applied in serial form on receive data conductor 122 (designated RX Data), which is coupled to sync logic circuit 60 and parity check circuit 54 and receive shift register 56, is loaded into receive shift register 56 into a serial format at a rate determined by a signal generated by clock generator 58 and applied to receive shift register 56 by means of conductor 126. The data is then shifted in parallel by means of bus 82 to receive data register 38.

Control register 36 stores and generates signals which control the various data transfers occurring in ACIA chip 10, and is connected to request-to-send ($\overline{RTS}$) conductor 130, and is also connected to clock select circuitry 48 by means of conductor 106, and to interrupt logic circuitry 50 by means of conductor 104, and to receive control circuit 52 by means of conductor 102, and to transmit control circuit 42 by conductor 96.

Receiver control circuit 52 is connected to parity check circuit 54 by means of conductor 120.

Status register 34 is, in a presently preferred embodiment of the invention, an eight bit register which stores information representative of the status of various conductors and circuits in ACIA chip 10. Status register 34 is connected to transmit control circuit 42 by means of conductor 84, clear to send ($\overline{CTS}$) conductor 116, by means of conductor 86. $\overline{CTS}$ is also connected to transmit control circuit 42. Status register 34 is connected to interrupt logic circuitry 50 by means of conductor 88, and to parity check circuit 54 by means of conductor 90 and to data carrier detect loss ($\overline{DCD}$) conductor 92 and to recover control circuit 52 by means of conductor 94. Sync logic circuit 60 is connected to clock generator circuit by means of conductor 132. Transmit control circuit 42 is connected to status register 34 by conductor 84 and to control register 36 by conductor 96. Receiver control circuit 52 is connected to status register 34 by conductor 94 and to control register 36 by conductor 102.

Figure 2:
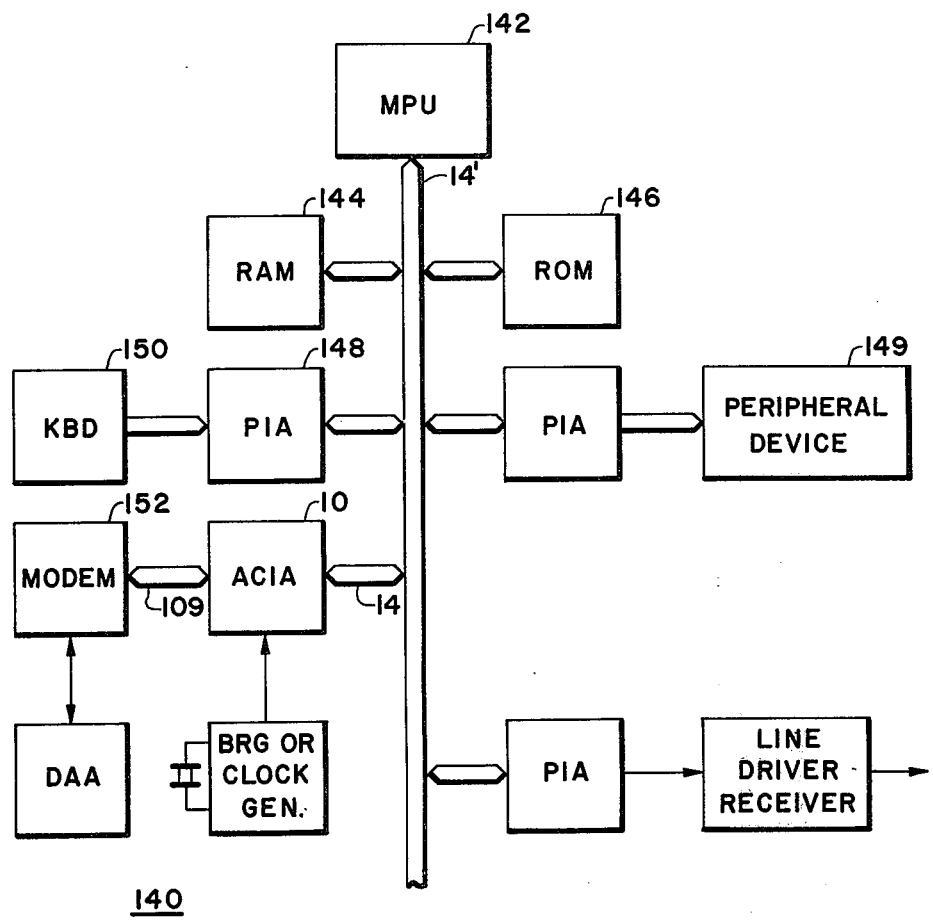
FIG. 2 is a logic diagram of another embodiment of the invention.

FIG. 2 is a block diagram of a typical microcomputer system in which the presently preferred embodiment of the asynchronous communications interface adaptor may be utilized. Microcomputer 140 includes microprocessor chip 142, which may be as described in the above mentioned patent application Ser. No. 519,150 Microprocessor circuit 142 is connected to a bidirectional data bus 14'. Random access memory (RAM) 144 and read only memory (ROM) 146 are connected, respectively, by means of their data bus lines, to the data conductors which constitute bidirectional data bus 14'. A plurality of peripheral interface adaptor chips 148 are connected by means of their bidirectional data input output conductors to the respective conductors of data bus 14'. (It will be understood that chips 142, 148, 10, etc. may be packaged in suitable semiconductor packages, such as dual-in-line packages). An exemplary peripheral interface adaptor is described in detail in copending patent application Ser. No. 519,138 mentioned above. A peripheral interface adaptor unit such as 148 may be utilized to couple peripheral devices such as key board 150 to data bus 14' to allow microprocessor 142 to communicate therewith. Peripheral interface adaptors may also be used to couple other peripheral devices, such as teletypes, (TTY), cathode ray tubes (CRT), control panels, cassettes, etc., designated in FIG. 2 by reference numeral 149.

ACIA chip 10, as shown in FIG. 1, may be connected by means of data bus 14 to microcomputer data bus 14'. A modem 152 may be connected to conductors 109, which may perform the functions of receiving data, transmitting data, and modem control.

Figure 3:
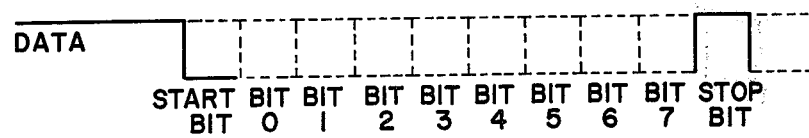
FIG. 3 is a diagram showing a serial word format.

As asynchronous communications interface adaptor according to the invention provides the communications data formatting function as well as the means for controlling a modum or other communications peripheral. It provides the required address and internal register selection logic circuitry, chip enable logic circuitry, control (R/W) logic circuitry and bus interface logic for compatibility with a microprocessing unit (MPU) chip. The ACIA performs three distinct functions: asynchronous data transmission, asynchronous data reception, and limited modem control. In a presently preferred embodiment the ACIA according to the invention provides the capability to transmit and receive eight-bit or nine-bit words including optional parity bits, plus associated start and stop bits. FIG. 3 shows the serial word format including start and stop bits. Parity bits, not shown, may be inserted. A preferred design provides for separate data rates for transmitting and receiving.

ACIA chip 10 has an interrupt circuit 50 which acts on internal signals derived from three independent sources, the transmitter section, the receiver section, and the modum control interface section. The transmit data register 32 being empty will cause such an internal interrupt signal. The interrupt logic 50 is automatically reset by loading the transmitter data register from the buffer 12. The receive data register 38 being full (i.e., containing a character, i.e., word) will cause an internal interrupt signal to be generated by status register 34 on conductor 88 which will automatically be reset when received data is read, i.e., loaded by ACIA chip 10 onto bidirectional data bus 14 when R/W conductor 28 is at a logical 1. A loss of data carrier ($\overline{DCD}$) going high will cause bit of status register 34 to be set, and causes the receiver section to be reset. The interrupt caused by $\overline{DCD}$ will be cleared when the status and receiver data register are read. The $\overline{DCD}$ status bit will be cleared when both the $\overline{DCD}$ input returns to a low level and the status and receiver data register has been read. A bus-controllable internal reset function, which is part of the control logic 36, is provided which resets the status buffer, clears the transmitter and receiver shift registers, and resets all counters and control logic. In addition, an automatic power-on reset system gives start-up protection until the normal bus controlled master reset is utilized during initialization. The power-on reset circuit is cleared by the bus controlled master reset function and associated circuitry.

The functional operation of the ACIA chip 10 is as follows: ACIA chip 10 consists of three-state bus drivers and receivers and multiplexers and in section 12 of FIG. 1, and also includes selection or address logic 16, parity logic 46 and 54, a parallel-to-serial converter including transmit data register 32 and transmit shift register 40, a serial-to-parallel converter including receive shift register 52 and receive data register 38.

Since ACIA chip 10 may be interfaced to a microprocessing unit, as in FIG. 2, the awareness of the following information is necessary. In a preferred embodiment, the MPU utilizes a 16 bit memory address register and address bus (not shown). The data transfers are provided over an 8-bit bidirectional data bus 14'. The register select (RS) input 20 is utilized to select one of four internal ACIA register locations, i.e., 32, 34, 36, or 38 in conjunction with the R/W line 28. The ACIA chip 10 itself is selected by wire decoding three of the sixteen address lines of the microcomputer of FIG. 2 in addition to RS input 20. The R/W control line 28 determines the direction of the data flow on bidirectional data bus 14 and is used, in addition, to aid selection of the internal registers mentioned above while Enable (E) input 30 causes the input output buffers in buffer section 12 to be enabled.

The eight-bit data bus 14 is interfaced by three-state bus drivers and receivers in section 12. Chip 10 is selected when $CS_0$ and $CS_1$ are high and $\overline{CS_2}$ is low. The R/W line causes the bus drivers to be activated by E when the MPU chip is undergoing a Read operation, for example, "reading" the ACIA chip 10 when R/W equals a logical 1, ACIA chip 10 being selected. Conversely, when the MPU is undergoing a write operation, R/W equals a logical 0, and the bus receiver circuits in section 12 are enabled. The register select (RS) input 20 selects the "data" registers (transmit data register 32 and receive data register 38 when RS equals a logical 1 and selects the status register 34 or the control register 36 when RS is equal to logical 0. The R/W line selects the "write only" registers, that is transmit data register 32 and control register 36 when R/W is at a logical 0 and selects the "read only" registers, received data register 38 and the status register 34 when R/W is equal to logical 0. The meaning of "write only" register is that such a register is only written into from the buffer section 12 and the bidirectional data bus 14, and is never read from such that the data is sent out on data bus 14; an analogous meaning is associated with the term "read only" register.

dedicated to selecting one of three divide clock ratios and to establishing a master reset function which resets all of the logic on the chip. Bits 2, 3 and 4 of control register 36 are dedicated to selecting one of eight different combinations of data word lengths, parity bits, and stop bits. Bits 5 and 6 of control register 36 control the "transmitter buffer empty" interrupt output, the state of the request to send ($\overline{RTS}$) output and the transmission of a "Break" level (i.e., space). Bit 7 of the control register controls interrupts being caused by the "receiver data register full" indicator and by $\overline{DCD}$. It should be noted that writing data into the transmit data register 32 causes the "transmit data empty" bit in status register 34 to go low and data can then be transmitted. Transfer of data therefrom causes the transmit data register empty bit to indicate empty. Upon receiving a complete character, data is automatically transferred to the empty receive data register 38 from receive shift register 56, which event causes the receive data register full bit in status register 34 to go high, allowing data to be read through bidirectional data bus 14. The nondestructive read cycle causes the "receive data register full" bit to be cleared. When the receive data register 38 is full, the automatic transfer of data from the receive shift register 56 is inhibited so that the contents of receive data register 38 remains valid.

The transmitting sequence consists of reading the ACIA status register 34 either as a result of an interrupt signal from circuit 50 or in the ACIA's turn in a "polling" sequence by the MPU of circuits connected to bidirection data bus 14'. The transmitter data register empty status is determined, and when empty, the write sequence is initiated and a character is loaded into the transmit data register 32. As soon as the transmit shift register 140 is available, the character in the transmit data register 32 is serialized and transmitted from the transmit data output 108 along with a leading start bit and a trailing stop bit or bits inserted by transmitter

TABLE I

| Buffer Address | RS . $\overline{R/W}$ | RS . R/W | $\overline{RS}$ . $\overline{R/W}$ | $\overline{RS}$ . R/W |
|---|---|---|---|---|
| Bus Line Number | Transmit Data Register | Receiver Data Register | Control Register | Status Register |
| | (Write Only) | (Read Only) | (Write Only) | (Read Only) |
| 0 | Data Bit 0 | Data Bit 0 | Clk. Divide Sel. | Rx Data Rg. Full |
| 1 | Data Bit 1 | Data Bit 1 | Clk. Divide Sel. | Tx Data Reg. Empty |
| 2 | Data Bit 2 | Data Bit 2 | Word Sel. 1 | Data Carrier Det. loss |
| 3 | Data Bit 3 | Data Bit 3 | Word Sel. 2 | Clear to Send |
| 4 | Data Bit 4 | Data Bit 4 | Word Sel. 3 | Framing Error |
| 5 | Data Bit 5 | Data Bit 5 | Tx Control 1 | Overrun (OVRN) |
| 6 | Data Bit 6 | Data Bit 6 | Tx Control 2 | Parity Error (PE) |
| 7 | Data Bit 7 | Data Bit 7 | Rx Interrupt Enable | Interrupt Request |

Table 1 defines the functions of the transmit data register 32, the receive data register 38, the control register 36, and the status register 34 for a presently preferred embodiment of the invention. The combinations of the RS and R/W inputs required to select each of the registers are indicated in the "Buffer Address" row of table 1. The "Bus Line Number" designations refer to the conductors of bidirectional data bus 14 and the corresponding bits of the four abovementioned internal registers. Bits 0 and 1 of control register 36 are control circuit 42. Parity (odd or even) can be optionally added to the character by circuit 46 and will occur between the last data bit and the first stop bit. The word length can range between eight and nine bits (including parity) plus the start and stop bits in a presently preferred embodiment of the invention. Parity, word length, number of stop bits (one or two), clock divider ratio, and transmit interrupt enable can all be selected by means of the MPU bus 14; (under program control) and the ACIA control registers. A length of break (break is defined as all spaces in the serial word format, i.e., all logical 0's) can be programmed from the MPU data bus 14'. The control bit for the break character is set to initiate "break" and reset to terminate the space condition. The bit rate of transmission is determined at the transmit clock frequency applied to line 128 and the clock divider select state as determined by the state of the first two control register bits.

Data is received by means of the receive data input 122. The leading mark-to-space transition (i.e., 1 to 0 transition) of the start bit synchronizes the internal clock generator with the timing of the data being received by means of sync (i.e., synchronizing) logic 60. False start bit deletion will insure against synchronizing on noise by insuring that a full one-half bit of the start time frame has been received before synchronizing to the bit time occurs. Two divide ratios are available in a presently preferred embodiment for purposes of bit synchronization. These are 16 and 64, for higher precision. The clock will be automatically synchronized to the theoretical data midpoint. When the character reception is complete, the character (word) will be automatically loaded into the receive data register 38 if it is empty. As the characters are being received, parity will be checked and the error indication, if any, will be available in the status register 34 which contains the following information. First, a framing error indicates the absence of the stop bit. Second, an overrun error indicates one or more characters have been lost. Third, the receive data register full indicator indicates a character has been received and is available for the MPU. Fourth, the parity error bit of status register 34 indicates the number of mark bits does not agree with the even or odd parity selected. The parity bit is stripped from the data being transferred to receiver data register 38 and in the case of a seven bit word, the eighth bit will be low.

When data is transferred into the receive data register 38, the receive data register full bit of status register 34 is set and an interrupt is initiated, assuming the receiver interrupt is enabled. The MPU will then read the ACIA status register 34 to determine the source of the internal interrupt signal and whether the character is valid. The receive data register full status bit will indicate that the receive data register 38 is full and MPU chip 142 will subsequently read the receive data register 38. The interrupt and receive data register full status bit will then be reset automatically. Parity, word length, and interrupt enable are programmed via the microprocessor control bus 14' and control register 36.

If the received data register full status bit indicates receive data register 38 is full when the incoming character is complete and ready to be transferred to receive data register 38, the transfer will be inhibited and an overrun indication will be stored in an internal overrun flip-flop. When the receive data register 38 is read, transferring the last good character prior to overrunning to the bus 14, the internal overrun indication is transferred to the status register 34 and the receive data register full status bit is set. The next successive reading of the receiver data register 38 will clear the overrun status bit unless an additional overrun has occurred in the meantime.

Figure 4:
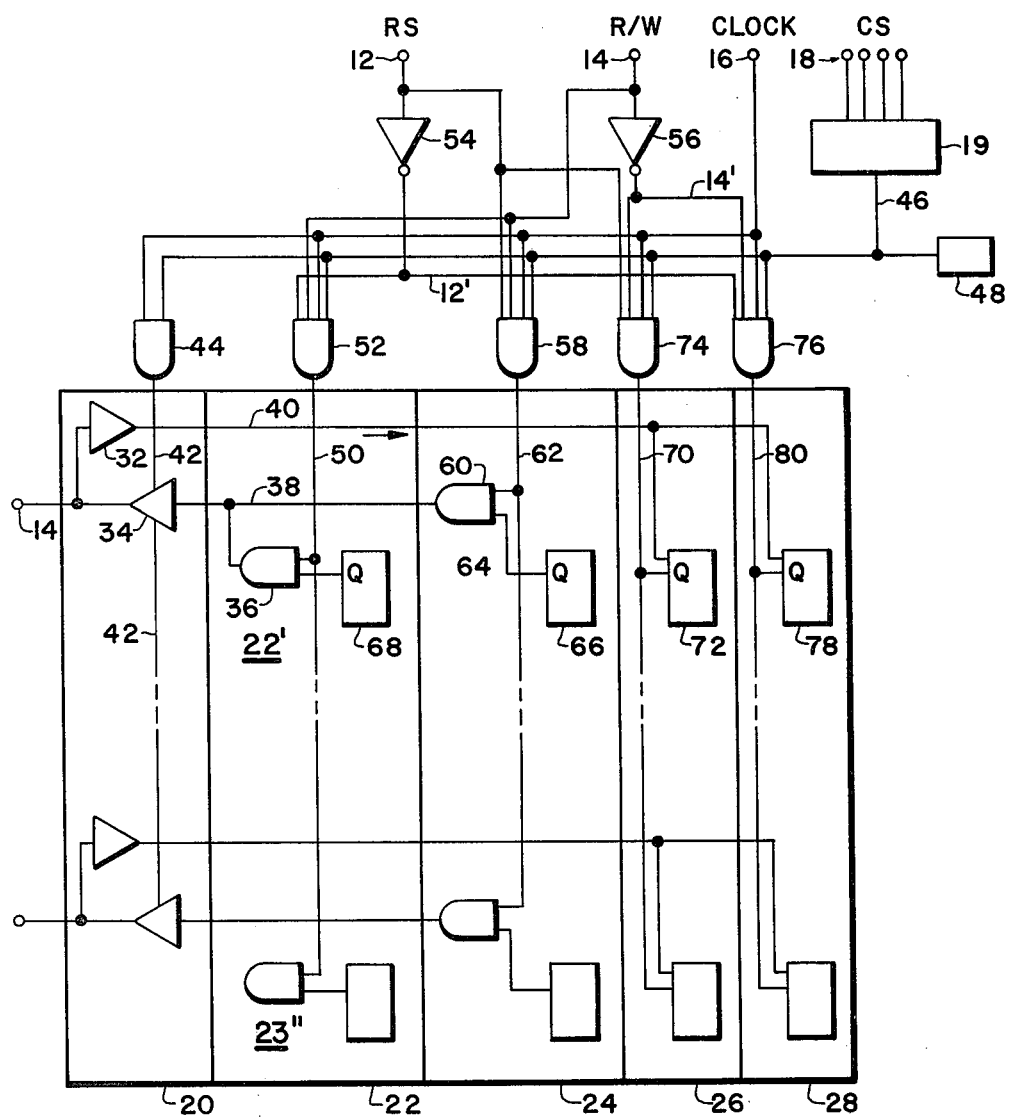
FIG. 4 is a logic diagram of an embodiment of the invention.

Referring to FIG. 4, integrated circuit 10 includes thereon four multi-bit dedicated registers 22, 24, 26, and 28. As indicated by the drawing, each of the registers may include a plurality of bits such as 22', 22''. A bit 22' of status register 22 includes flip-flop 68 and two-input AND GATE 36. Of course, any gate which effectively performs a NAND or an AND function or indicates a coincidence of input logic variables may be utilized in various circuit implementations in place of the AND gates described herein. The Q output of flip-flop 68 is connected to one input of AND gate 36. The other input of AND gate 36 is connected to the output of AND gate 52 by means of conductor 50, which extends to other bits of status register 22. Status register 22 includes a plurality of flip-flops 68 which each correspond to one bit of status register 22. The data of the status register is stored in these flip-flops. Status register 22 also includes a plurality of gates such as 36 which are utilized to aid in coupling one of registers 22 or 24, if either of them are selected, to internal data bus conductor 38. The inputs to flip-flop 68 are not shown, but are presumed to be coupled to other circuitry on chip 10. Internal bus conductor 38 is connected to an output of AND gate 36 and into an input of buffer circuit 34, the output of which is connected to external bidirectional data bus conductor 14, and also to an input of buffer circuit 32, the output of which is connected to internal data bus conductor 40. (The direction of data on conductor 40 is indicated by the arrow, and the direction of data on internal bus conductor 38 is indicated by the other arrow.)

Receiver data (RX data) register 24 includes flip-flop 66 having output 64 connected to an input of AND gate 60. The other input of AND gate 60 is connected to conductor 62, which is connected to the output of AND gate 58. Conductor 62 extends to the other bits of receive data register 24. Each of the bits of receiver data register 24 includes a similarly connected flip-flop and an AND gate 60. Transmitter data (TX data) register 26 includes flip-flop 72 having an input connected to internal data bus conductor 40 and having a clock input connected to conductor 70, which extends to the other bits of transmit data register 26 and is connected also to the output of NAND gate 74. Again, there is a separate flip-flop such as 72 for each bit of transmit data register 26. Control register 28 also includes a flip-flop 78 having an input connected to data bus conductor 40 and a clock input connected to conductor 80 which extends to other similar flip-flops which comprise register 28 and is also connected to the output of AND gate 76. Only the first and last bits of each of the above mentioned registers are shown in the drawings for convenience.

Buffer circuit 34 is enabled by an input connected to conductor 42 which is connected to the output of AND gate 44. AND gate 44 has one input connected to clock conductor 16 and another input connected to conductor 46, which is an output of decode circuit 19. AND gate 52 has inputs connected, respectively, to conductor 46, $\overline{RS}$ 12', R/W control conductor 14, and clock conductor 16. The symbol R/W means read/write in a preferred embodiment, wherein the register selection circuitry is coupled to the read/write output of an integrated microprocessor chip, as described in the above named copending patent applications. AND gate 58 has its inputs connected, respectively, to RS conductor 12, to R/W control conductor 14, to clock conductor 16, and to decode circuit output conductor 46. AND gate 74 has its inputs connected to, respectively, $\overline{R/W}$ conductor 14' to clock conductor 16, to RS conductor 12, and to conductor 46. AND gate 76 has its inputs connected, respectively, R/W conductor 14' clock conductor 16, $\overline{RS}$ conductor 12', and conductor 46.

Conductor 46 is also connected to additional circuitry 48, which may perform some other function on chip 10. Decode circuit 19 is a decode circuit which has a plurality of chip select inputs 18, and decodes a particular combination of those inputs, which are typically address and address complement conductors of a microprocessor address bus, as described in the above mentioned copending patent applications. This permits selection under program control of chip 10. Inverter 56 has its inputs connected to control conductor 14, and inverter 54 has its input connected to conductor 12. From the foregoing it is clear that transmit data register 26 and control register 28 are write-only dedicated registers and receiver data register 24 and status register 22 are readonly dedicated registers. With R/W at a 1 the state of RS determines which register will be read. The Receiver Data Register is selected when RS is a 1 the status register is selected when RS is a zero. Similarly, if R/W is a 0 the state of RS determines which register will be written. That is the transmitter register is selected if RS is a 1 and the control register is selected if RS is a zero. This fact permits elimination of an additional register select input from chip 10, resulting in substantial economies.

While the invention has been described in relation to a presently preferred embodiment thereof, those skilled in the art will recognize that variations in arrangement and placement of parts may be made within the scope of the invention to suit various requirements.

What is claimed is:

1. A semiconductor chip having coupled thereto an address bus, a bidirectional data bus, a control input, at least one register selection input, and including a chip decoder logic circuitry coupled to said address bus comprising:
    a plurality of read-only registers;
    an equal number of write-only registers;
    register decode means coupled to said read-only registers and said write-only registers, said chip decoder logic circuitry, said control input, and said register selection input or inputs for selecting one of said read-only or write-only registers as a function of logical levels of said control input and of no more than N-1 register selection inputs where there are $2^N/2$ read-only registers and $2^N/2$ write-only registers on said semiconductor chip, N being an integer.

2. A semiconductor chip as recited in claim 1 further including clock means coupled to a plurality of inputs of said register decode means.

3. A semiconductor chip as recited in claim 1 further including chip decode means coupled to said address bus for selecting said semiconductor chip as a function of an address on said address bus, said chip decode means having an output coupled to an input of said register decode means.

4. A semiconductor chip as recited in claim 1 wherein said control input is coupled to read/write conductor means of said digital system for selecting in combination with said register selection inputs which of said read-only registers is selected when a first logical level is on said read/write conductor and selecting in combination with said register selection inputs which of said write-only registers is selected when an opposite logical level is on said read/write conductor.

5. A semiconductor chip as recited in claim 4 where N is equal to 2.

6. A semiconductor chip as recited in claim 3 wherein said output of said chip decode means is also coupled to other logic circuitry on said semiconductor chip.

7. A semiconductor chip having coupled thereto a bidirectional data bus, an address bus, a register selection input, and a read/write input for controlling whether data is written into or read out of said semiconductor chip via said bidirectional data bus, and having a chip decode circuit thereon coupled to said address bus comprising:
    an input buffer circuit coupled to said bidirectional data bus, said input buffer circuit having first outputs and a second output corresponding, respectively, to each conductor of said bidirectional data bus;
    two read-only registers coupled to said first outputs;
    two write-only registers coupled to said second outputs;
    register decode means coupled to each of said read-only and write-only registers for selecting said first write-only register when said register select input is at a logical 1 and said read/write input is at a logical 0, and for selecting said second write-only register when both said register select input and said read/write inputs are at a logical 0; and selecting said first read only register when said register select input and said read/write input are both at a logical 1, and selecting said second read-only register when said register select input is at a logical 0 and said read/write input is at a logical 1.

8. The semiconductor chip as recited in claim 7 wherein said first read-only register is a transmitter data register, said second write-only register is a control register, said first read-only register is a receiver data register, and said second read-only register is a status register.

9. The semiconductor chip as recited in claim 8 further including a clock input coupled to the input of said register decode means.

10. A semiconductor chip having coupled thereto an address bus, a bidirectional data bus, a control input, and at least one register selection input, comprising:
    a plurality of read-only registers;
    an equal number of write-only registers;
    register decode means coupled to said read-only registers and said write-only registers, and to said control input, and to said register selection input or inputs for selecting one of said read-only or write-only registers as a function of logical levels of said control input and of no more than N-1 register selection inputs where there are $2^N/2$ read-only registers and write-only registers on said semiconductor chip, N being an integer.

11. A method of operating a semiconductor chip including $2^N/2$ read-only registers and $2^N/2$ write-only registers and having coupled thereto a control input and N-1 register selection inputs, said read-only registers and said write-only registers being coupled by means of buffer circuitry to a bidirectional data bus, said method comprising the steps of:
    selecting all of said read-only registers or alternatively, selecting all of said write-only registers by means of selection circuitry coupled to said read-only registers and write-only registers and said control input, conditioned upon a logic level of said control input, and
    selecting one of said read-only registers or, alternatively, one of said write-only registers by means of said selection circuitry coupled also to said register selection inputs, conditionally upon logic levels of said N-1 register selection inputs.

12. The method as recited in claim 11 wherein said control input is a read-write control input.

* * * * *